US 6,644,808 B1

United States Patent
Liu

(12) United States Patent
(10) Patent No.: US 6,644,808 B1
(45) Date of Patent: Nov. 11, 2003

(54) END FASTENER FOR EYEGLASS RETAINERS

(75) Inventor: Frederick E. Liu, Wilson, WY (US)

(73) Assignee: Chums, Inc., Hurricane, UT (US)

( * ) Notice: Subject to any disclaimer, the term of this patent is extended or adjusted under 35 U.S.C. 154(b) by 0 days.

(21) Appl. No.: 10/214,790

(22) Filed: Aug. 7, 2002

(51) Int. Cl.$^7$ .............................................. G02C 3/00
(52) U.S. Cl. ......................................... 351/156; 351/157
(58) Field of Search ..................... 351/123, 156, 351/157

(56) References Cited

U.S. PATENT DOCUMENTS

| 2,539,922 A | | 1/1951 | Nyberg | |
|---|---|---|---|---|
| 2,704,961 A | | 3/1955 | Weil | |
| 4,696,556 A | | 9/1987 | Perry, III | |
| 5,202,707 A | * | 4/1993 | Halbridge | 351/123 |
| RE34,836 E | * | 1/1995 | Murrell | 351/123 |
| 5,575,042 A | | 11/1996 | Kalbach | |
| 5,655,264 A | | 8/1997 | Davancens | |
| 6,182,334 B1 | * | 2/2001 | Davancens | 24/3.3 |
| 6,533,413 B2 | * | 3/2003 | Wright et al. | 351/156 |

* cited by examiner

*Primary Examiner*—Huy Mai
(74) *Attorney, Agent, or Firm*—John R. Thompson; Stoel Rives LLP

(57) ABSTRACT

An end fastener for attaching an end of an eyeglass retainer to the end of an eyeglass temple piece includes an elastomeric fastener body secured to the retainer cord or rope and having an internal bore extending into the body from an insertion opening. The diameter of the bore varies from a largest diameter near the insertion opening to a smallest diameter at the end of the bore away from the opening. A bulbous portion may be provided adjacent the opening and have the largest bore diameter therein. Because of the variety of bore diameters, the bore will receive and hold a wide variety of temple piece end sizes.

16 Claims, 2 Drawing Sheets

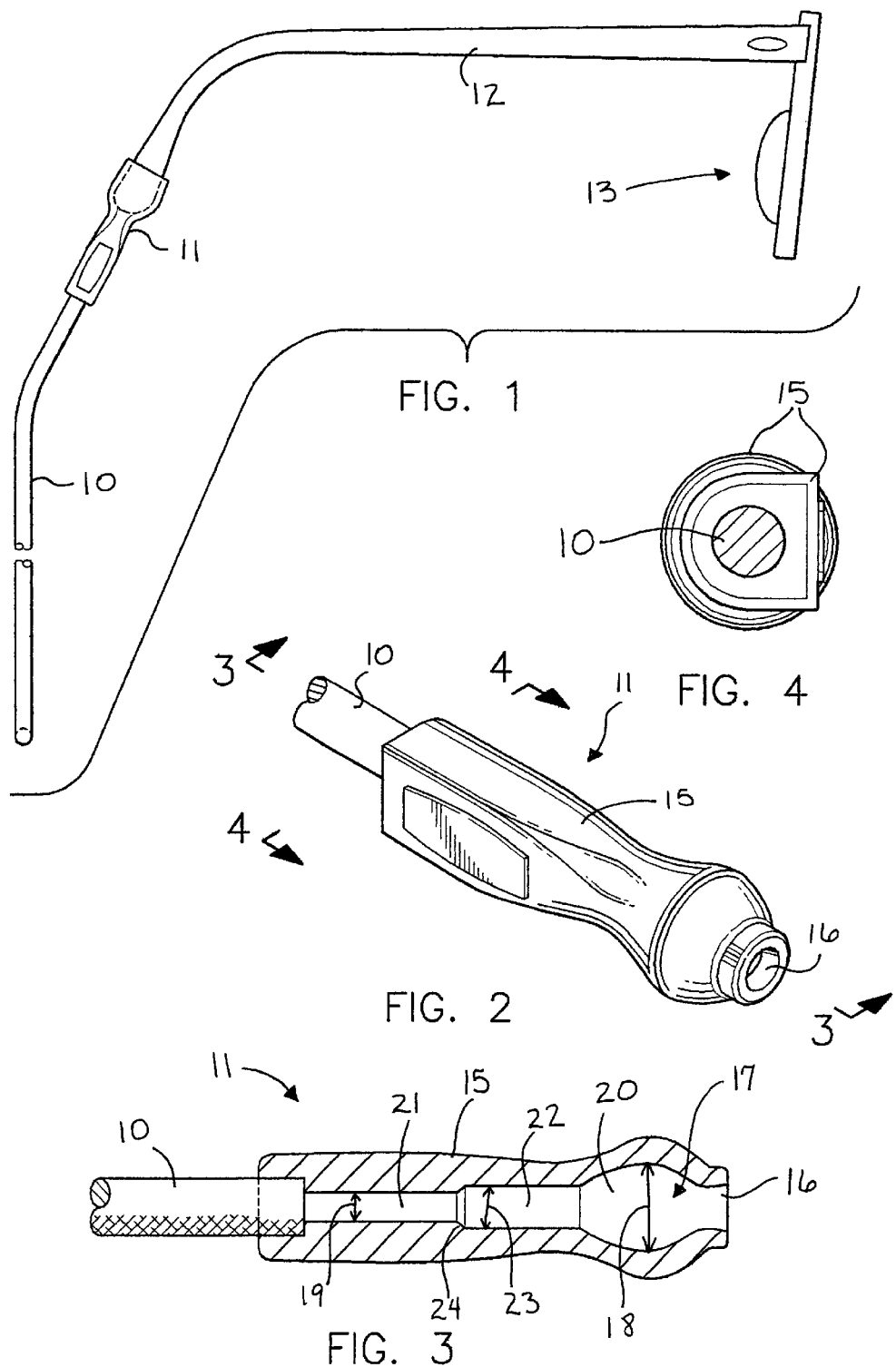

END FASTENER FOR EYEGLASS RETAINERS

BACKGROUND OF THE INVENTION

1. Field

Figure 5:
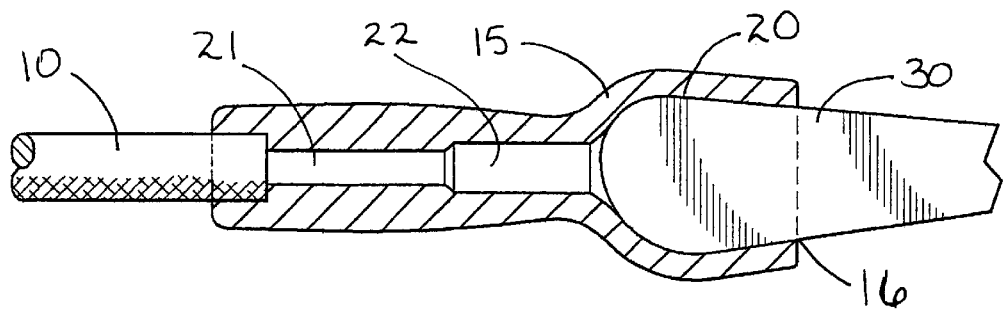

The invention is in the field of eyeglass retainers and particularly of the fasteners at the ends of the retainer cord for attaching the retainer to the ends of eyeglass temple pieces.

2. State of the Art

An eyeglass retainer generally comprises a length of cord or other material of some type with fasteners on the ends to attach the temple pieces of a pair of glasses to respective ends of the cord thereby attaching the glasses to the cord. The retainer then serves to hold the glasses around the user's neck if they fall off the user's head during vigorous activity, and allow the glasses to hang around the user's neck during periods of nonuse to be handy for immediate use when needed.

There are numerous types of eyeglass retainers in use today which include a cord with fasteners at the ends of the cord to attach to the ends of the temple pieces of the glasses to be retained. These traditionally have included as the fasteners a loop of material (often the cord material merely looped at the ends) through which the ends of the temple pieces are threaded so that the temple pieces pass through the loops and are held in the loops. A variation of the loops where the loops are formed of a plastic material attached to the ends of the cord are shown in U.S. Pat. Nos. 5,655,264 and 5,904,938.

Elastic tubes attached to the ends of the cord which stretch as the end of a temple piece is pushed into the tube and then holds the temple piece in the tube by friction, are well known as fasteners and are shown in U.S. Pat. Nos. 2,704,961, 5,575,042, and 6,182,334. While the elastic tubular bodies will stretch over a range of sizes of temple pieces, the wide range of sizes of temple pieces in use on eyeglasses today present a problem. Any elastic material has limits within which it will stretch and the materials and configurations in use today will not accept the wide variations which exist. Thus, while such end fasteners are sized to receive, stretch over, and hold the more common intermediate size temple piece ends, they cannot hold the wide variety of sizes of temple piece ends in use today.

SUMMARY OF THE INVENTION

According to the invention, an end fastener for an eyeglass retainer includes an elastomeric body with a temple piece insertion opening and an internal bore extending from the opening into the body. The internal bore varies in diameter from a largest diameter near the opening to a smallest diameter inward of the opening. At least one additional intermediate diameter portion is included. The largest diameter portion of the bore receives and holds large temple piece ends while the smallest diameter portion of the bore receives and holds small temple piece ends, which pass through the larger diameter portions of the bore without being held. Intermediate size temple piece ends are held by the intermediate portion. In this way, the retainer end piece can hold a very wide range of sizes of temple piece ends.

The internal bore preferably includes a bulbous portion adjacent the insertion opening which includes the largest diameter and accepts and holds the larger temple piece ends. An elongate extension, including at least two different diameter portions, extends from the bulbous section to accept and hold smaller temple piece ends. The elongate extension may include tubular portions, may be tapered, or may include various curved portions of varying configuration.

THE DRAWINGS

Figure 6:
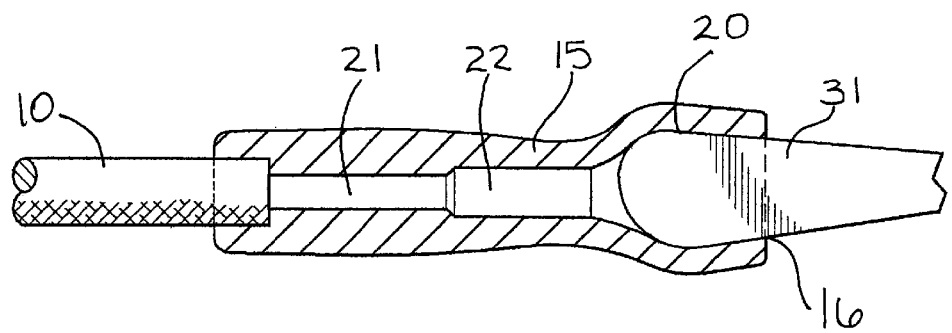
Figure 7:
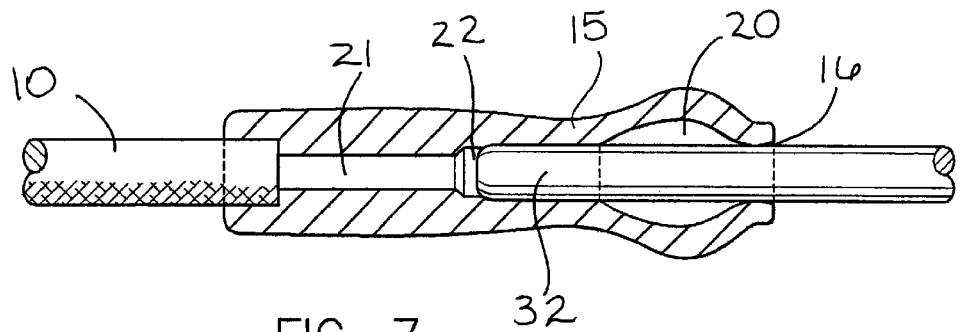
Figure 8:
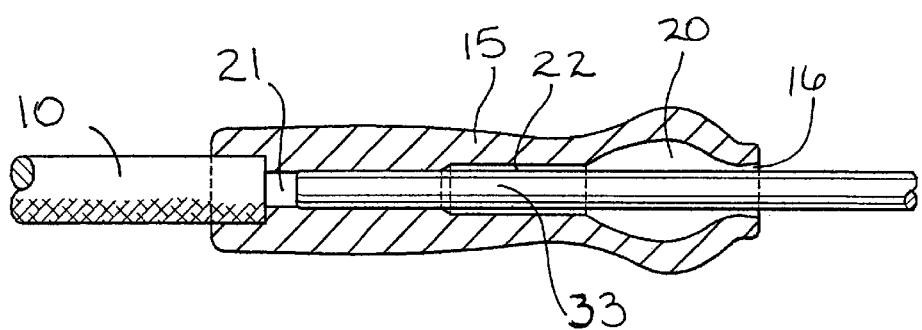

In the accompanying drawings, which show the best mode currently contemplated for carrying out the invention:

FIG. 1 is a side elevation of a pair of eyeglasses with an eyeglass retainer having the invention attached;

FIG. 2, a perspective view of a particular embodiment of the end fastener of the invention;

FIG. 3, a vertical section through the end fastener of the retainer of FIG. 1, taken on the line 3—3 of FIG. 2;

FIG. 4, an end elevation of the embodiment of end fastener of FIG. 2, taken on the line 4—4 of FIG. 2;

FIG. 5, a view similar to that of FIG. 3 showing a large eyeglass temple piece being held by the faster;

FIG. 6, a view similar to that of FIGS. 3 and 5 showing a smaller large eyeglass temple piece being held by the fastener;

FIG. 7, a view similar to that of FIGS. 3, 5, and 6 showing a medium size eyeglass temple piece being held by the fastener; and FIG. 8, a view similar to that of FIGS. 3, 5, 6, and 7 showing a small size eyeglass temple piece being held by the fastener.

DETAILED DESCRIPTION OF THE ILLUSTRATED EMBODIMENTS

FIG. 1 shows a type of eyeglass retainer having a retainer cord 10 with eyeglass temple piece faster 11 which slip over and frictionally hold the ends of eyeglass temple pieces 12 of eyeglasses 13. In the embodiment shown, the end pieces 11 are molded to the cord 10, but various other means of attachment are known and may be used.

Each fastener 11 is formed by a body 15 having a temple piece insertion opening 16, FIGS. 2 and 3, with an internal bore 17, FIG. 3, of varying diameter extending into body 15 from the insertion opening 16. The bore 17 has its largest diameter 18 near the insertion opening 16 and its smallest diameter 19 at the end of the bore opposite the end with the insertion opening. In the embodiment shown, the internal bore 17 has a largest diameter 18 near the insertion opening 16 in a bulbous portion 20 of the bore and a smallest diameter 19 in the small diameter tubular end portion 21 of an elongate extension of the bore. An intermediate tubular portion 22 of intermediate diameter 23 is part of the elongate extension extending from the bulbous portion of the bore. A steeply tapered step 24 is formed between the tubular portions 22 and 21 of intermediate and small diameters, respectively. While two tubular portions are shown, any number of tubular portions of different diameters could be used, as desired. Further, rather than steps occurring between the tubular portions, longer tapers could connect the tubular portions. In addition, the bulbous portion could be replaced with a tubular portion of largest diameter. Rather than tubular portions, each portion could be somewhat curved or slightly bulbous. Rather than the tubular portions shown and presently preferred, the bore could have a continuous taper from largest diameter to smallest diameter. The important feature is that the bore has various diameters to receive and hold temple pieces of various sizes.

While a preferred embodiment of particular outward appearance configuration is shown, it should be realized that this is merely an example of a fastener of the invention and the appearance features of such embodiment are not functional and are merely ornamental. A fastener incorporating the functional features of the invention, i.e., the bore of varying diameters, may take many different forms from the standpoint of appearance.

The body is made of an elastomeric material which can be stretched and has a memory to return to its original configuration after stretching. This material may be a rubber or synthetic rubber such as an elestomeric compound sold under the name "Dynaflex" (part no. 2711 30D SH"A") by GLS Corp.

In use, the end of a temple piece of the eyeglasses to be retained is inserted through the insertion opening 16 into the bore 17, and is pushed into the bore until it reaches a portion of the bore that it stretches to the extent that the stretched elastomeric material will retain and hold the temple piece in the bore against normal forces occurring during wearing of the eyeglasses, either during normal wearing or hanging around the neck, trying to pull the glasses from the retainer. However, the temple piece can be removed by removal forces manually applied to pull the temple piece from the bore when desired to remove it. How far the end of a temple piece will extend into the bore depends upon the size of the end of the temple piece. If the end of the temple piece is large, as shown for temple piece 30, FIG. 5, which may be a fat tortoise shell type of temple piece, it will stretch and fit through insertion opening 16 into bulbous portion 20 and will not fit into the cylindrical extension. Insertion opening 16 is generally smaller than the largest diameter in bulbous portion 20, so the bulbous portion 20 will fit a range of temple piece sizes. A smaller, but still large temple piece end 31 is shown held by bulbous portion 20 in FIG. 6. Any temple piece which stretches the elastomeric material around insertion opening 16 will be held in bulbous portion 20 regardless of whether or not it stretches the material in bulbous section 20 itself, i.e., is larger than the largest diameter.

A smaller, intermediate size temple piece 32, FIG. 7, will fit into the intermediate tubular portion 22, but not into the smallest portion 21. Temple piece end 32 will at least slightly stretch body 15 in intermediate portion 22 to the extent that it will be frictionally held in section 22. A small temple piece 33, FIG. 8, of smallest expected size, such as a thin wire temple piece, will fit into, with at least slight stretching of the elastomeric material, smallest tubular portion 21.

Since the body is of an elastomeric material, each portion of the internal bore will fit a range of temple sizes. Thus, as with the prior art tubular fasteners, i.e., single diameter bore fasteners, which fit, because the material stretches around the temple piece, a variety of sizes of temple pieces, each of the different diameter bore portions of the fastener of the invention will fit a variety of temple piece sizes, thereby giving a much larger range of temple pieces that will be fit. In effect, the illustrated fastener of the invention with three bore portions of different diameters act as three different prior art tubular fasteners.

In the embodiment shown, the cord or rope 10 will usually be of braided nylon of either 3 mm or 5 mm width. The end fastener is preferably secured to the cord or rope 10 by being molded thereto. The process of molding an elastomeric material to a nylon rope is known in the art and usually involves use of a two part adhesive, such as Chemlok 48S and Chemlok 487B made by Lord Corporation Chemical Products Division, being applied to the end of the rope at the time of molding the fastener thereon to insure a good chemical bond between the nylon cord and the molded elastomer. While molding attachment is presently preferred, any other method of attachment can be used. For example, any of the presently known methods for attaching an end fastener to a retainer cord can be used, such as attachment rings or adhesives.

The variation in diameters of the bore, from the largest diameter to the smallest diameter, will be chosen based upon the largest and smallest temple piece ends desired to be fit by the fastener. Thus, the largest diameter will be chosen as necessary to fit the largest size temple piece end expected to be encountered in use of the fastener or desired to be fit by the fastener and the smallest diameter will be chosen as necessary to fit the smallest size temple piece expected to be encountered in use of the fastener or desired to be fit by the fastener. The number of intermediate portions or the taper of the bore will be chosen based upon the difference between the largest and smallest diameters used. As presently preferred for use with the wide range of eyeglasses currently commercially available, the insertion opening has a diameter of about 0.099 inches, the bore has a largest diameter in the bulbous portion of about 0.201 inches, a smallest diameter of about 0.063 inches, and an intermediate diameter of about 0.094 inches. The bore has an overall length of about 0.918 inches, with the tubular portion having the smallest diameter being about 0.249 inches in length, the portion having the intermediate diameter being about 0.277 inches in length, and the bulbous portion being about 0.392 inches in length. These dimensions are based on the insert used to form the bore during molding of a currently preferred embodiment of the end fastener and may not represent the dimensions of the actual molded part, depending upon the molding process. Further, they are merely an example of dimensions that can be used, and are not critical. Further, while the smallest diameter portion of the bore is shown extending to the cord, it could end prior to reaching the cord so that a plug of elastomeric material is positioned in the body between the cord and the end of the smallest diameter portion of the bore.

Whereas the invention is here illustrated and described with reference to an embodiment thereof presently contemplated as the best mode of carrying out the invention in actual practice, it is to be understood that various changes may be made in adapting the invention to different embodiments without departing from the broader inventive concepts disclosed herein and comprehended by the claims that follow.

I claim:

1. An end fastener for attaching an end of an eyeglass retainer to the end of an eyeglass temple piece, comprising:
    an elastomeric body having a temple piece insertion opening and an internal bore extending into the body from the opening, the internal bore varying in diameter from a largest diameter near the opening to a smallest diameter inward of the opening,
    wherein the insertion opening has a diameter and the largest diameter is larger than the diameter of the insertion opening,
    wherein the bore includes a bulbous cavity adjacent the opening and an elongate extension extending from the bulbous cavity, and
    wherein the largest diameter is in the bulbous cavity.

2. An end fastener for attaching an end of an eyeglass retainer to the end of an eyeglass temple piece according to claim 1, wherein the elongate extension has opposite ends and varies in diameter from a largest diameter at an end adjoining the bulbous cavity to a smallest diameter at the opposite end.

3. An end fastener for attaching an end of an eyeglass retainer to the end of an eyeglass temple piece according to claim 2, wherein the diameter of the elongate extension varies in steps between the largest and smallest diameter.

4. An end fastener for attaching an end of an eyeglass retainer to the end of an eyeglass temple piece according to claim 3, wherein the fastener is secured to a retainer cord.

5. An end fastener for attaching an end of an eyeglass retainer to the end of an eyeglass temple piece according to claim 4 wherein the retainer cord is a braided nylon cord.

6. An end fastener for attaching an end of an eyeglass retainer to the end of an eyeglass temple piece according to claim 5, wherein the end fastener is molded onto the end of a retainer cord.

7. An end fastener for attaching an end of an eyeglass retainer to the end of an eyeglass temple piece according to claim 1, wherein the fastener is secured to a retainer cord.

8. An end fastener for attaching an end of an eyeglass retainer to the end of an eyeglass temple piece according to claim 7 wherein the retainer cord is a braided nylon cord.

9. An end fastener for attaching an end of an eyeglass retainer to the end of an eyeglass temple piece according to claim 8, wherein the end fastener is molded onto the end of a retainer cord.

10. An end fastener for attaching an end of an eyeglass retainer to the end of an eyeglass temple piece according to claim 1, wherein the diameter of the elongate extension varies in steps between the largest and smallest diameter.

11. An eyeglass retainer, comprising:
   an end fastener for receiving an end of an eyeglass temple piece, and including,
      an elastomeric body having,
         a temple piece insertion opening having a diameter, and
         an internal bore extending into the elastomeric body from the opening, the internal bore including a bulbous cavity adjacent the opening, the internal bore varying in diameter from a largest diameter near the opening to a smallest diameter inward of the opening,
         wherein the largest diameter is larger than the diameter of the insertion opening and is in the bulbous cavity; and
   a retainer cord secured to the end fastener.

12. The eyeglass retainer of claim 11, wherein the internal bore includes an elongate extension extending from the bulbous cavity.

13. The eyeglass retainer of claim 12, wherein the elongate extension has opposite ends and varies in diameter from a largest diameter at an end adjoining the bulbous cavity to a smallest diameter at the opposite end.

14. The eyeglass retainer of claim 13, wherein the diameter of the elongate extension varies in steps between the largest and smallest diameter.

15. The eyeglass retainer of claim 11, wherein the retainer cord is a braided nylon cord.

16. The eyeglass retainer of claim 11, wherein the end fastener is molded onto the retainer cord.

\* \* \* \* \*

UNITED STATES PATENT AND TRADEMARK OFFICE
CERTIFICATE OF CORRECTION

PATENT NO. : 6,644,808 B1
DATED : November 11, 2003
INVENTOR(S) : Frederick E. Liu It is certified that error appears in the above-identified patent and that said Letters Patent is hereby corrected as shown below:

<u>Column 2,</u>
Line 20, "faster" should be -- fastener --.

<u>Column 5,</u>
Line 10, "claim 4" should be -- claim 1 --

Signed and Sealed this

Sixteenth Day of March, 2004

JON W. DUDAS
*Acting Director of the United States Patent and Trademark Office*